United States Patent [19]

Clark et al.

[11] 4,375,333
[45] Mar. 1, 1983

[54] MICROPROCESSOR DIRECTED OPTICAL PYROMETER

[75] Inventors: Alexander H. Clark, Norristown; John E. O'Neil, Blue Bell; Albert S. Tenney, III, North Wales, all of Pa.

[73] Assignee: Leeds & Northrup Company, North Wales, Pa.

[21] Appl. No.: 197,453

[22] Filed: Oct. 16, 1980

[51] Int. Cl.³ .............................................. G01J 5/56
[52] U.S. Cl. ........................................ 356/47; 356/43
[58] Field of Search ................................... 356/43–50, 356/231–232; 250/332, 554, 578; 73/355, 355 EM

[56] References Cited

U.S. PATENT DOCUMENTS

| | | | |
|---|---|---|---|
| 2,252,015 | 8/1941 | Machler | 356/50 |
| 3,079,507 | 2/1963 | George | 250/217 |
| 3,163,700 | 12/1964 | Williamson | 356/47 |
| 3,264,931 | 8/1966 | Ackerman et al. | 356/48 |
| 3,264,931 | 8/1966 | Ackerman et al. | 88/22.5 |
| 3,354,773 | 11/1967 | Shreve | 88/22.5 |
| 4,080,532 | 3/1978 | Hopper | 250/332 |
| 4,121,459 | 10/1978 | MaCall | 73/355 R |
| 4,317,045 | 2/1982 | Coe et al. | 250/578 |

FOREIGN PATENT DOCUMENTS

| | | | |
|---|---|---|---|
| 142755 | 7/1980 | Fed. Rep. of Germany | 356/43 |
| 1410913 | 10/1975 | United Kingdom | 356/43 |

OTHER PUBLICATIONS

Milton, A. F., "Focal Plane Design for IR Imaging Systems", Eascon 1976 Record, Wash., D.C. 26–29 Sep. 1976, pp. 18A–18D.

EG & G Reticon, "G Series Solid State Scanners", Folder 87066.

Primary Examiner—William H. Punter
Attorney, Agent, or Firm—Raymond F. MacKay; William G. Miller, Jr.

[57] ABSTRACT

A portable automatic disappearing filament optical pyrometer having low power demand incorporating a solid state line scanner as a sensing element is controlled by a microprocessor to perform a balance between the radiation from a target and a lamp filament to provide a digital indication of the temperature of the target including compensation for emissivity of the target.

5 Claims, 5 Drawing Figures

MICROPROCESSOR DIRECTED OPTICAL PYROMETER

Automatic optical pyrometers of the disappearing filament type in the past have generally utilized a single radiation sensing or detecting device that alternately is subjected to radiation from a standard calibrated lamp and radiation from the target source whose temperature is to be measured. Such alternate viewing is accomplished by switching the path of radiation by mirrors, prisms, or shutters, or the combination of these devices. These automatic disappearing filament optical pyrometers were large in size and required significant operating power to provide the functions necessary. In view of the power demands of the instrument, they were not portable and usually required connection to an AC source of power. Furthermore, such automatic optical pyrometers provided as an output an indication of the current flowing in the calibrated standard lamp as an indication of the temperature of the source of radiation being measured. It was necessary then to convert the indicated lamp current to temperature by reference to a calibration curve that related lamp current to temperature.

The present invention represents an improvement in the automatic disappearing filament optical pyrometer that results in an instrument having a sufficiently low power demand, notwithstanding the drain of the standard lamp that it can be operated from batteries contained within the confines of a small case adapted to be hand-held and thus combines the portability of the manually operated disappearing filament pyrometer with the desirable features resulting from automatic operation. These advantages result from a new approach to the design of the instrument wherein a microprocessor directs the operation of the unit and a solid state line scanner is utilized as the radiation sensing element, thus avoiding the necessity of switching the optical path as in the prior art automatic pyrometers. With the solid state line scanner, the scanning is accomplished under the control of the microprocessor by electrically switching between the discrete sensitive areas of a solid state array, part of which are responsive to radiation from the standard lamp and part of which are responsive to radiation from the target.

In order to extend the range of the solid state line scanner to accommodate large variations in radiation from the target source from very high levels of radiation to very low levels of radiation, the pyrometer incorporates a variable frequency scanning rate that is automatically changed by the microprocessor in accordance with either or both the current in the calibrated standard lamp or the level of the signal from the solid state line scanner.

To insure that changes in position in the filament of the standard lamp does not interfere with the proper operation of the pyrometer, the pyrometer is provided with a feature whereby the solid state array is scanned initially with the lamp current turned off and the pyrometer sighted on the target to clearly identify those sensitive areas in the solid state array that receive radiation from the lamp filament. With such identification performed each time that the pyrometer is used, all of the discrete sensitive areas in the array which represent the standard lamp temperature are clearly identified.

It is an object of this invention to provide a portable automatic optical pyrometer of the disappearing filament type having low power requirements.

It is another object of this invention to provide an automatic optical pyrometer utilizing a solid state array of discrete sensitive areas as the detecting element in a disappearing filament optical pyrometer.

It is a further object of this invention to provide for variable rate scanning of a solid state array in a disappearing filament optical pyrometer.

It is a still further object of this invention to utilize a solid state array as the sensing element in a disappearing optical pyrometer with the filament position relative to the array being identified each time that the pyrometer is switched on.

These and other objects will be apparent from the following detailed description of this invention in which FIG. 1 is a schematic diagram of the optical arrangement of the automatic disappearing filament optical pyrometer;

Figure 1:
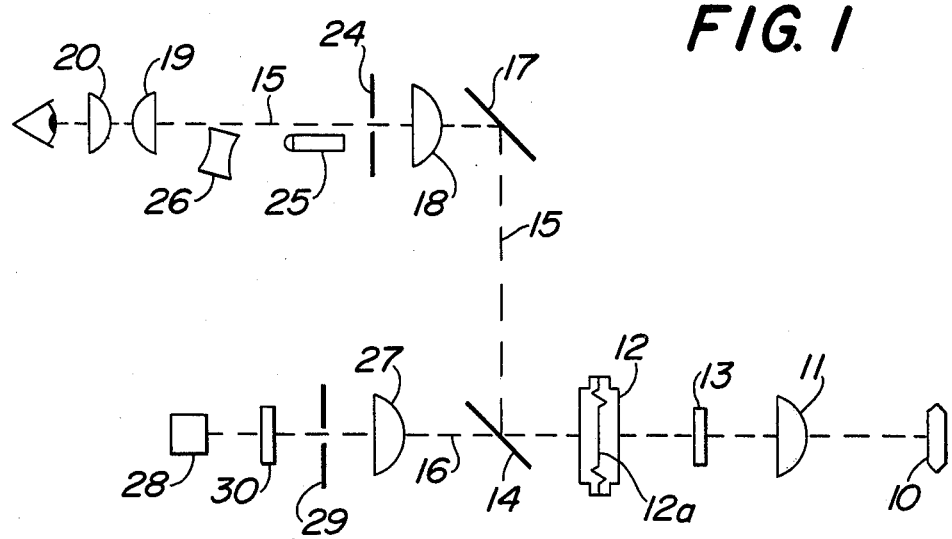

Referring now to FIG. 1, the optical features of the automatic disappearing filament optical pyrometer are shown in schematic form. The radiation from the target 10 which represents any body whose temperature is to be measured enters the optical pyrometer through an objective lens 11 which serves to focus the image of the target 10 on the plane of a filament 12a of a standard calibrated lamp 12. Lamp 12 is a specially designed lamp of the type shown in U.S. Pat. No. 2,176,087 specifically for use in disappearing filament optical pyrometers. In order to measure the temperature of the target the current-temperature calibration of the lamp 12 must be known. In calibrating a lamp the current through the filament is determined when its brilliance matches that of a target at two different temperatures representing the highest and lowest temperatures to be read. The complete curve of current versus temperature is then established by calculation between the maximum and minimum values. In the present pyrometer in order to focus the image of the target 10 on the plane of the filament 12a the objective lens 11 is moveably mounted in manner well known to those skilled in the art.

Inasmuch as the lamp filament 12a is capable of producing only a limited range of brilliance there may be provided in the optical path between the objective lens 11 and the lamp 12 an absorption screen or filter 13 to attenuate the brilliance of the light from the target 10. With the screen or filter 13 in place in the optical path it is not necessary in the measurement of high temperatures to operate the lamp filament 12a at excessively high temperatures in order to obtain an optical match of the filament brilliance with the brilliance of the image of the target 10 under observation. The radiation from the target 10 and from the filament 12a of the standard calibrated lamp 12 then passes through a beam splitter 14. The beam splitter 14 splits the radiation into two optical paths 15 and 16.

The optical path 15 is used in visually sighting the optical system of the pyrometer onto the target 10 so that the radiation from the target 10 will enter the automatic optical pyrometer and be focused in the plane of the filament 12a of the standard calibrated lamp 12. The optical path 15 includes a mirror 17 and a field lens 18. The field lens 18 directs the image of the target 10 and the filament 12a into a Ramsden eyepiece consisting of a pair of lenses 19 and 20. The Ramsden eyepiece including lenses 19 and 20 is used to magnify the image of the filament 12a so that the filament 12a may be more readily observed by the operator. The eyepiece is adjustable to allow focusing by the operator of the filament 12a. Located between the field lens 18 and the Ramsden eyepiece is an exit diaphragm 24 which serves to eliminate the effect of diffractions and aberrations in the optical path to produce a better defined disappearance of the filament 12a into the image of the target 10 as observed through the eyepiece lenses 19 and 20. Located near the optical path 15 is a digital display device 25 and a display lens 26 for projecting the image of the digital display device 25 into the eyepiece lenses 19 and 20. The digital display device 25 preferably is of the light emitting diode type. An operator viewing through the eyepieces 19 and 20 thus can simultaneously observe the target 10, the filament 12a, and the information displayed in the digital display device 25.

In the optical path 16, there is shown a sensor lens 27 which serves to direct radiation from the target 10 and the filament 12a onto the active area of a radiation sensing device 28. The radiation sensing device 28 preferably is a solid state image sensor having a multiplicity of photo sensitive areas linearly arrayed in a plane perpendicular to the optical path 16 and with the linear array substantially perpendicular to the filament 12a. The image of the filament 12a directed by the sensor lens 27 onto the sensor 28 thus falls upon a small group of photosensitive areas preferably near the center of the linear array of multiplicity of photosensitive areas. It has been found that the sensor 28 may preferably be of the type sold by EG&G Reticon of Sunnyvale, Calif. and identified as an RL128G solid state line scanner. This solid state line scanner includes a row of 128 silicon photodiodes, each having a capacitor connected in parallel therewith and integral shift register circuitry to scan the photodiodes by applying to the shift register a series of clock pulses. In operation the capacitor is initially charged and then discharges through the photodiode in accordance with the intensity of the light falling on the photodiode. During the scanning operation a metal oxide semiconductor (MOS) switch is closed for one clock period and the capacitor is recharged. The recharge current is a measure of the intensity of light falling on the silicon photodiode.

Figure 2:
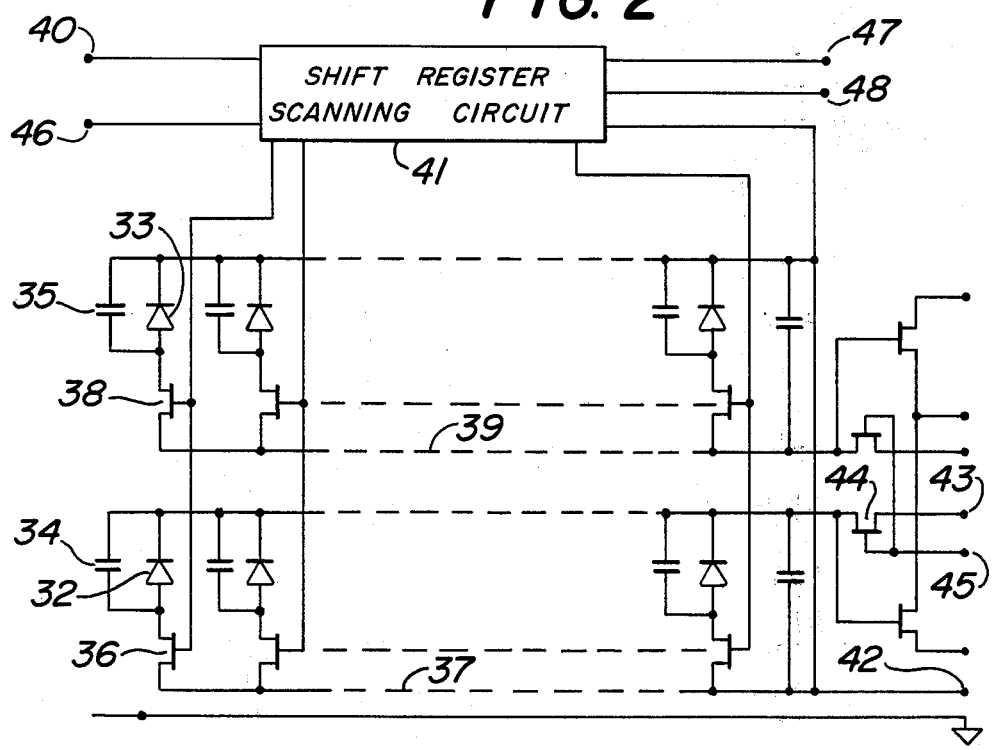
FIG. 2 is a simplified schematic diagram of a sensor suitable for use in the automatic optical pyrometer.

FIG. 2 shows a simplified equivalent circuit of the sensor 28. Each cell associated with a photosensitive area includes a photodiode 32 and a dummy diode 33 with associated respective storage capacities 34 and 35. Photodiode 32 is connected through an MOS switch 36 to a video recharge line 37 and diode 33 is similarly connected through an MOS switch 38 to a dummy recharge line 39. The switches 37 and 38 are sequentially closed for one clock period of the clock signals applied to terminal 40 by a shift register scanning circuit 41. Each capacity 34 and 35 is recharged to the level of voltage applied to a positive voltage input terminal 42 which stores a corresponding charge on the capacities 34 and 35. During the interval that MOS switch 36 is open, the charge stored is gradually removed by photocurrent which is related to the diode sensitivity and the intensity of light to which the photodiode is subjected. During the next scan, when the MOS switch 36 is again closed, the charge is replaced through a video recharge terminal 43 and an MOS switch 44 which is activated by a signal applied to a recharge gate terminal 45. Each scan of the photodiodes 32 is initiated by a start signal applied to a start terminal 46. The shift register 41 produces an end of scan signal at terminal 47.

Figure 3:
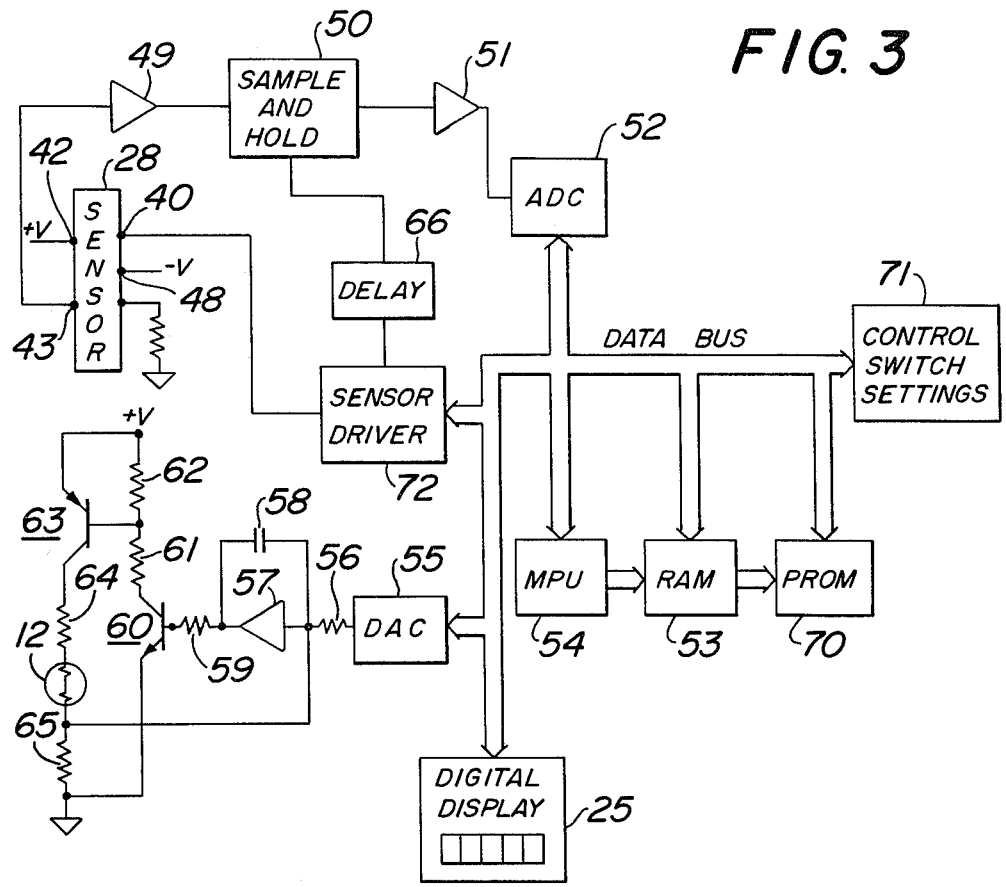
FIG. 3 is a schematic block diagram showing the electrical elements connected to the microprocessor which directs the operation of the automatic disappearing filament optical pyrometer.

As shown in FIG. 3, the video recharge terminal 43 of the sensor 28 is connected to a preamplifier 49. The signal output from the terminal 43 and the sensor 28 consists of a series of output pulses from the photodiode array having a frequency which varies between 1 to 5 kilohertz and an output level varying from 1 to 50 millivolts. The details of a preamplifier 49 suitable for this application is disclosed in a copending application by Hitt and Kern entitled PREAMPLIFIER FOR LOW VOLTAGE SIGNALS IN THE PRESENCE OF HIGH VOLTAGE NOISE, Ser. No. 240,660 filed Mar. 5, 1981, and assigned to a common assignee, attorney's Docket No. L.T.-166. The output from the preamplifier 49 is applied to a sample and hold circuit 50 which samples the signal from the preamplifier 49 at a time under the control of a delay circuit 66 when the signal at the output from the preamplifier 49 representative of a signal from a single photodiode 36 is at its peak value. The signal from the sample and hold circuit 50 is in turn applied to a post amplifier 51 and to an analog digital converter 52. The digital signals from the analog to digital converter representative of the light intensity intercepted by each of the photodiodes 36 are stored in appropriate storage locations in the random access memory (RAM) 53 under the control of a microprocessing unit 54.

The microprocessor unit 54 directs the application of a digital signal representative of a desired current in the standard calibrated lamp 12 to a digital to analog converter 55. The analog output from the digital to analog converter 55 representative of the desired lamp current is applied through an input resistor 56 to the input terminal of a feedback amplifier 57. A negative feedback capacitor 58 is connected from the output of amplifier 57 to its input to eliminate undesirable response to noise. The output from the feedback amplifier 57 is also connected through a base resistor 59 to the base of a transistor 60 having its emitter electrode connected to signal common and its collector connected through a pair of resistors 61 and 62 to a voltage source indicated as +V. The base of a second transistor 63 is connected to the connection between the resistors 61 and 62. The emitter of the transistor 63 is connected to the voltage source +V and the collector is connected to signal common by a resistor 64, the standard calibrated lamp 12 and a feedback resistor 65. The voltage then generated across the feedback resistor 65 by the flow of current through the lamp 12 is fed back to the input of amplifier 57 as a negative feedback voltage to ensure that the current through the lamp 12 is at a value in accordance with the signal output from the digital to analog converter 55.

FIG. 3 also shows a programmable read-only memory (PROM) 70, a control switch setting block 71, and a sensor driver 72 whose functions will be described in conjunction with the description of the operation of the automatic optical pyrometer.

When the automatic disappearing optical pyrometer is to be used to measure the temperature of a target 10, an on-off switch, not shown, is actuated to the on position and power from a battery, not shown, is applied to the electrical circuits. As the filament 12a of the lamp 12 may have moved slightly in position due to jarring of the instrument when the instrument is turned off, the microprocessing unit 54 controls the pyrometer so that the sensor is scanned for thirty-two scans with the filament of the lamp turned off. With the thirty-two scans completed and the information from these scans stored in RAM 53, which has one storage location for each of the photodiodes in the sensor 28, those memory locations that have substantially zero signal identify locations that correspond with the lamp filament 12a.

While it is possible that the signals corresponding to each photodiode could be used in making the comparison between the brilliance of the light from the target and the brilliance of the light from the lamp filament 12a, in practice it has been found sufficient that the signal from the three photodiodes in the center of the lamp filament 12a and three photodiodes receiving radiation from the target 10 located on each side of the lamp filament photodiodes provides sufficient signal and sufficient accuracy for a proper comparison between the brilliance of the lamp and the brilliance of the target.

In making a temperature measurement, the sensor 28 is scanned for thirty-two scans and the sum of the readings from each scan is stored in the RAM 53. There is thereby effectively obtained an average reading from each of the photodiodes of the sensor 28. The averaging of a plurality of scans improves the signal to noise ratio of the operating system. After thirty-two scans have been completed, a difference signal is obtained which is the difference between the signal representing the brilliance from the target 10 and the signal from the filament 12a. This difference signal is then used to produce a change in the lamp current required to make the lamp current sufficient that there will be an optical balance between the target 10 and the filament 12a. It will be understood that when the pyrometer is turned on with the filament current off, the difference signal will represent the brilliance from the target 10 as there is no radiation from the filament 12a. Accordingly, when the lamp current comes on, it is at a magnitude determined by the signal level associated with the brilliance from the target 10. When the lamp current in filament 12a has been brought to a value that produces a match between the brilliance from the target 10 and the lamp filament 12a, the voltage signal representing the lamp current as the voltage across the resistor 65 is processed by the microcomputer 54 in conjunction with the information stored in the PROM 70 relating the temperature of the filament of the lamp 12 to the voltage of the lamp to produce a signal corresponding to the lamp temperature in °Celcius. If the operator has selected that the reading should be in °Fahrenheit, the microprocessing unit 54 converts the reading of °Celcius to °Fahrenheit. The signal representing the temperature of the target 10 is displayed on the digital display 25 which, as previously indicated, is visible through the eyepiece to the operator as he sights the optical pyrometer on the target 10.

As shown in FIG. 3, the sensor driver 72 is connected to the microprocessing unit 54. The sensor driver 72 provides clock pulses to input terminal 40 of the sensor 28 and delayed pulses through the pulse delay network 66 to the sample and hold circuit 50. Because the signal from the photodiodes of the sensor 28 is generated by virtue of the discharge by the photodiode current of the associated capacities, it is possible that for high illumination levels of the photodiodes that the capacity 34 will be substantially completely discharged during the scan time of the sensor. Also for very low levels of illumination of the photodiodes 32, the discharge of the capacity 34 may be so small that it is difficult to obtain an adequate reading from the sensor 28. In the automatic optical pyrometer, this limited dynamic range produced by the discharge times of the capacity 34 is significantly extended by controlling the pulse repetition frequency of the sensor driver 72 in accordance with a signal from the microprocessing unit 54 which varies with the magnitude of the lamp current through the filament 12a of lamp 12. When the lamp filament current increases in magnitude, the pulse repetition frequency of the sensor driver 72 is increased so that the time between scans decreases and therefore does not permit the capacity 34 to be completely discharged during the time interval by the photocurrent produced by high levels of illumination on the photodiodes 32. Conversely, when the lamp current in lamp filament 12a is reduced to lower levels, the pulse repetition frequency of the sensor driver 72 is automatically reduced so that the low levels of illumination on the photodiodes 32 will have a longer discharge time interval to produce a recharging signal level that will be distinguishable from ambient conditions for measuring purposes.

Figure 4:
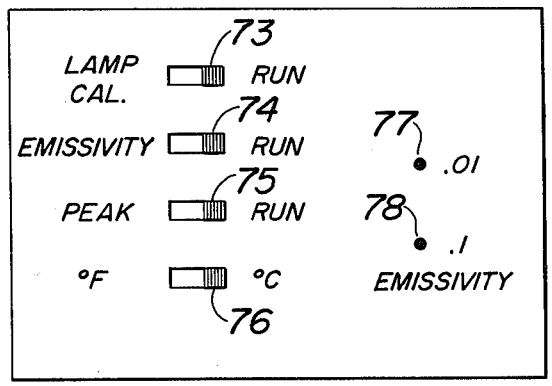
FIG. 4 is a view of one form of the operator's panel showing the control switches.

Shown in FIG. 4 is an operator's panel with the switches for controlling the operation of the automatic optical pyrometer. The panel as shown has four slide switches, 73–76 and two pushbutton switches 77 and 78. Slide switch 73 is a two-position switch having a Lamp Calibrate position to the left and a Run position to the right. The Lamp Calibrate position is used when it is desired to obtain a calibration of the pyrometer with the pyrometer sighted on a calibrated tungsten lamp at a known temperature. Switch 74 is a two position slide switch used to insert emissivity factor into the operation of the automatic optical pyrometer. With the switch 74 in the Emissivity position, an emissivity value is displayed on the digital display device 25 so that an emissivity factor may be inserted into the pyrometer to correspond with a known emissivity of the target 10. In order to effect the setting of the emissivity factor, two pushbuttons, 77 and 78, are provided and during the time that the emissivity switch 74 is in the Emissivity position, there is displayed on the digital display device 25 the emissivity constant that is being inserted into the pyrometer. By depressing the switch 78, large changes are made in the emissivity value whereas by depressing pushbutton switch 77, small incremental changes can be made in the emissivity factor. Slide switch 75 is a two position switch having a Peak position and a Run position. In the Peak position, the digital display device 25 will display the maximum value of temperature of the target 10 rather than the instanteous existing value. This is of help when large surfaces are scanned by the automatic optical pyrometer and it is desired to display the maximum temperature obtained during the scan rather than to obtain the existing temperature of a part of the body on which the automatic optical pyrometer is directed at any particular time. Slide switch 76 is a two position selector switch that permits the selection of the readout in the digital display device 25 to be either in °Fahrenheit or in °Celcius.

When the automatic disappearing optical pyrometer is used to measure the temperature of a target that is known to have an emissivity different from 1 and an emissivity factor has been inserted into the pyrometer by the pushbutton switches 77 and 78, the normal operation of the pyrometer in measuring the temperature of the target 10 is modified so that the signal representing the lamp voltage is first divided by the emissivity factor stored in the memory of the automatic optical pyrometer to obtain an adjusted value prior to the time that the calculation is performed to translate the lamp voltage into the temperature of the target 10.

As will be recognized by those skilled in the art, the PROM 70, in addition to having stored in memory the program that provides for the measurement of the temperature of the target 10 in accordance with the steps outlined above, including the control of the lamp current and the calculation of the temperature, also includes programs that provide for a check of the battery that powers the pyrometer to ensure that its voltage is within acceptable limits and which flashes the digital display in the display device 25 or produces other visual indications that the battery voltage is low; and further includes a program for routine housekeeping when the apparatus is initially turned on.

The random access memory 53 includes memory storage locations for the signals from each of the photodiodes in the sensor 28, the emissivity factor stored in the pyrometer, the calculated temperature for the display device 25, and the memory locations corresponding with the lamp filament as well as transient memory spaces used in the computation of results that are repeatedly used for many different values at different times during the measuring and operating cycles.

In FIG. 1 there is shown an absorption screen or filter 13. In practice this may be one of a series of filters of different attenuation that may be introduced into the radiation path to change the range of the pyrometer. When the value of the signals from the photodiodes 32 corresponding to the target 10 exceeds a predetermined high value, the microprocessor 54 causes the digital display device 25 to display all digits as "9" which is an indication to the operator that the range filter 13 should be changed to a filter having a greater attenuation. Conversely, when the value of the signal from photodiodes 32 falls below a predetermined low value, the digital display device 25 displays all digits as "0" to indicate that the range filter 13 should be changed to a filter having less attenuation. The manual selection of the filter not only changes the filter 13 but also introduces a signal into the RAM 53 indicative of the selected filter. This signal indicative of the selected filter 13 is used by the microprocessor 54 to compute an actual temperature for display based upon the characteristic of the filter 13 and the current through the lamp filament 12a.

It is to be understood that the change of filter 13 in response to a display of "0"'s or "9"'s in digital display device 25 can be accomplished automatically without departing from the scope of this invention.

Figure 5:
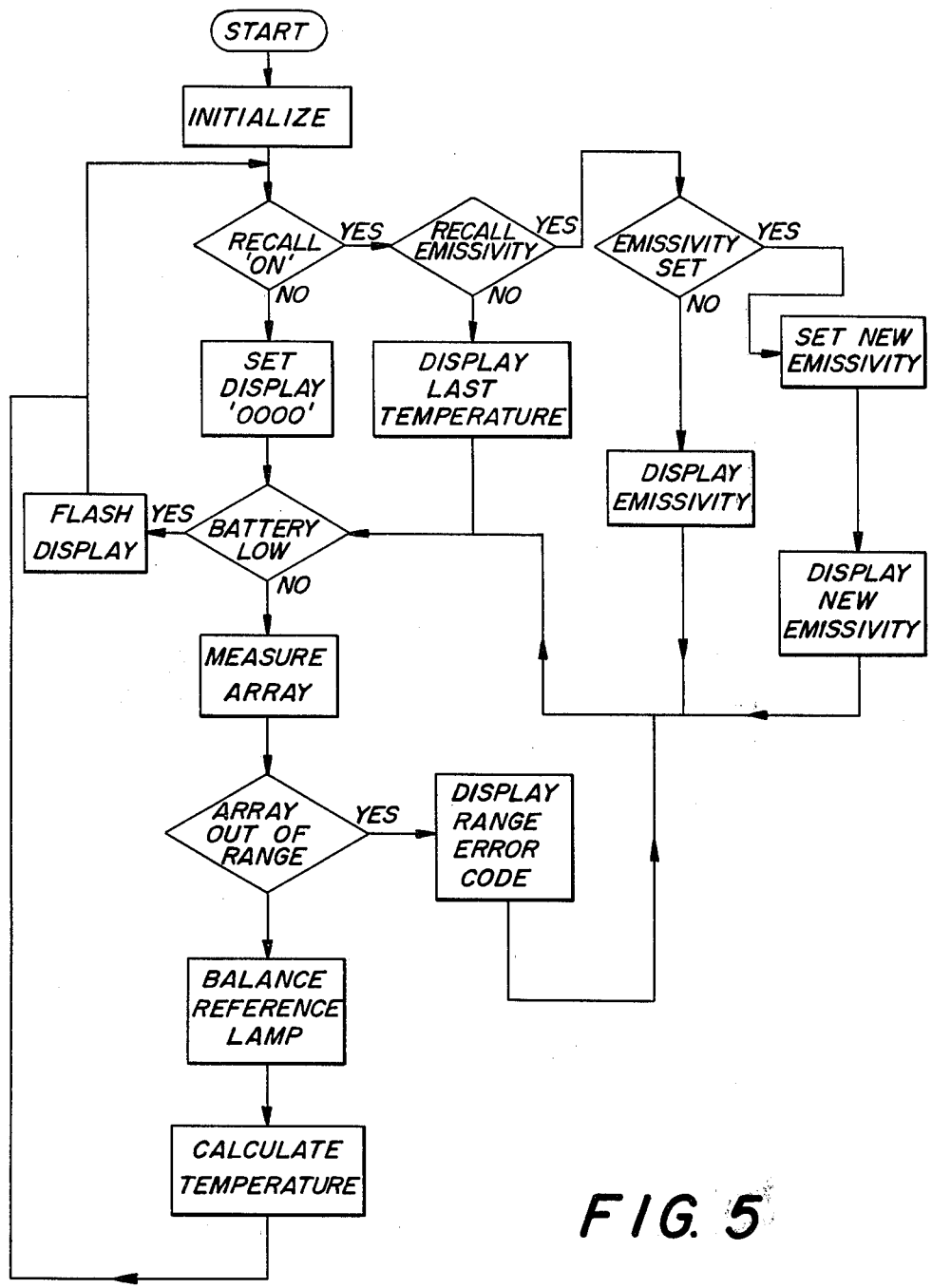
FIG. 5 is a flow chart for the pyrometer.

FIG. 5 is a flow chart showing the organization of the pyrometer and the steps that are performed under the control of the microprocessing unit 54.

What is claimed is:

1. A microprocessor directed disappearing filament pyrometer for measuring and displaying the temperature of a target area including
   a calibrated lamp having a linear filament;
   a solid state photoelectric detector array having a multiplicity of sensitive areas in a linear array, arranged in a substantially right angle relationship with respect to said linear filament of said calibrated lamp;
   means for continuously directing radiation from said linear filament of said calibrated lamp upon a first group of said sensitive areas and for continuously directing radiation from said target area upon a second group of said sensitive areas with a portion of said second group of sensitive areas being located on each side of said sensitive areas of said first group;
   means for scanning said groups of said sensitive areas for producing an output signal having a first data level dependent upon the intensity of radiation on said first group of sensitive areas and a second data level dependent upon the intensity of radiation on said second group of sensitive areas;
   means responsive to said output signal for producing a signal representative of the desired current flow through said linear filament of said calibrated lamp so that said first data level and said second data level of said output signal will be the same;
   means responsive to said desired current signal for adjusting said current flow through said linear filament of said calibrated lamp to said desired current; and
   indicating means responsive to said signal representative of said desired current flow for producing an indication of said temperature of said target area.

2. A pyrometer as claimed in claim 1 in which said means responsive to said output signal changes said signal representative of said desired current by an amount proportional to the magnitude of the difference between said first data level and said second data level of said output signal.

3. A pyrometer as claimed in claim 1 additionally including
   a filter means for attenuating the radiation from said target area;
   means responsive to the presence of said filter means for modifying said temperature of said target areas indicated by said indicating means;
   means for establishing a range of data levels for said output signal from said second group of sensitive areas,
   and
   means responsive to the existence of a second data level outside of said range for producing an indication by said indicating means that a change of said filter element is required.

4. A method for measuring and displaying the temperature of a target area using a microprocessor directed disappearing filament pyrometer having a calibrated lamp with a linear filament and a linear solid state photoelectric detector array having a multiplicity of sensitive areas comprising the steps of
   continuously directing radiation from said linear filament of said calibrated lamp upon a first group of said sensitive areas and for continuously directing radiation from said target area upon a second group of said sensitive areas;
   scanning said groups of said sensitive areas to produce an output signal from said photoelectric detector array having a first data level dependent upon the intensity of radiation of said first group of sensitive areas and a second data level dependent upon the intensity of radiation on said second group of sensitive areas, and
   producing from said output signal a current flow through said lamp so that said first data level and said second data level of said output signal will be the same;

the improvement comprising the step of initially scanning said groups of said sensitive areas with no current flow through said calibrated lamp to permit identification of said sensitive areas included in said first group.

5. The method of claim 4 including the additional step of establishing an initial current in said calibrated lamp at a magnitude determined by the signal level from said second group of sensitive areas during said initial scans.

* * * * *